Aug. 17, 1943. A. C. MAYNARD 2,327,327
ROTARY OPERATIVE FASTENER DEVICE AND INSTALLATION OF THE SAME
Filed June 25, 1941 2 Sheets-Sheet 1

Inventor:
Albert C. Maynard.
By John Todd
Atty.

Aug. 17, 1943.  A. C. MAYNARD  2,327,327
ROTARY OPERATIVE FASTENER DEVICE AND INSTALLATION OF THE SAME
Filed June 25, 1941  2 Sheets-Sheet 2

Inventor:
Albert C. Maynard,
By John Todd
Att'y

Patented Aug. 17, 1943

2,327,327

UNITED STATES PATENT OFFICE 2,327,327

ROTARY OPERATIVE FASTENER DEVICE AND INSTALLATION OF THE SAME

Albert C. Maynard, Oakland, Calif., assignor to United-Carr Fastener Corporation, Cambridge, Mass., a corporation of Massachusetts Application June 25, 1941, Serial No. 399,760

6 Claims. (Cl. 24—221)

This invention aims to provide improvements in fastener devices for securing together two or more members preferably plate-like, the device being of the so-called rotary operative type and adapted to draw the plates together on rotation of one part of the device relative to the other.

The chief object of my invention is the provision of a fastener device providing a socket unit which cooperates with a rotary stud unit in a manner to draw the parts to be secured firmly together. One of the features of my invention is directed to the provision of a shim member forming a part of the socket unit and acting as a rigid support for a lateral projection carried by a stud member, thereby making it impossible for the plates to move apart flatwise more than a few thousandths of an inch. The shim members may be formed to have different thicknesses cooperating with stud members which may provide varying distances between the shim engaging projection and stud head to enable the fastener device to be used to secure together plates of any desired combined thickness within a wide range.

Other objects and uses of my invention will be apparent from inspection of the drawings and specification hereinbelow set forth.

Referring to the drawings in which I have illustrated a preferred embodiment of my invention:

Figure 1:
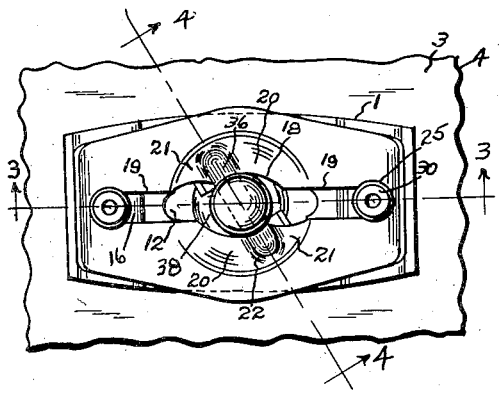
Fig. 1 is a front elevation of the installation showing two plates secured in face-to-face relation by my improved fastener device.
Figure 2:
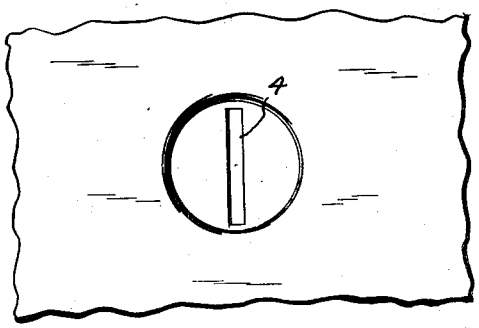
Fig. 2 is a rear view of the installation shown in Fig. 1.

Referring to the preferred forms of my fastener device illustrated in Figs. 1-10, the fastener devices shown therein differ only in the dimensions of their parts, the mechanical operation of each of the devices being substantially the same in each case, and for that reason the same numbers will be used to indicate equivalent elements throughout the various figures. My preferred fastener device, as illustrated in the drawings, comprises two units, namely: a stud engaging or socket unit 1 and a rotary stud unit 2. The socket unit 1 is secured on the inner side 3 of a flat supporting plate 4 which is one of the parts to be secured, and the rotary unit 2 is carried by a supporting plate 5 which is the other part to be secured. The plate 4 in my preferred form has a circular aperture 6 for receiving a portion of the rotary unit 2 and the plate 5 has an opening 7 surrounded by a frustro-conical embossment 8 which projects into the opening 6 when the plates are finally secured together so that they may lie in flush relation.

Referring in detail to the construction of my improved socket unit 1 I have shown one made up of two elongated main pieces comprising a plate-like fastener element or shim plate 9 and a locking member or spring plate 10 with the pieces disposed in superposed relation. The parts 9 and 10 are preferably in assembled relation prior to attachment of the unit to the plate 4 and the spring member 10 is loosely assembled with the shim 9 so as to flex relative to the shim for a purpose to be described.

Figure 3:
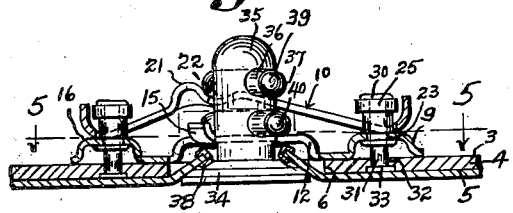
Fig. 3 is the section taken along the line 3—3 of Fig. 1.
Figure 4:
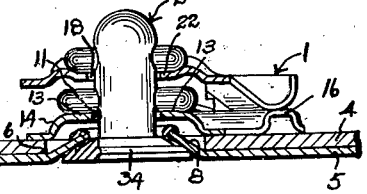
Fig. 4 is a section taken along the line 4—4 of Fig. 1.
Figure 5:
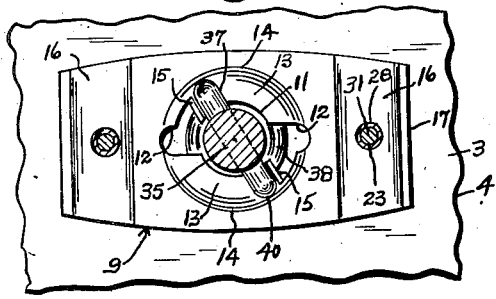
Fig. 5 is a section taken on the line 5—5 of Fig. 3.

The shim plate 9, illustrated in Figs. 1-10 of the drawings, is formed from a flat piece of stock and has a central opening 11. Slots 12—12 are provided on opposed sides of the opening 11 (Fig. 5). Locking surfaces 13 are provided on opposite sides of the opening 11 and in the installations shown in the drawings arc-shaped embossments 14 are provided adjacent the opening 11 to raise the locking surfaces a predetermined distance from the normal plane of the plate for a purpose to be described. A stop portion in the form of a lug 15 extends upwardly from the plane of each locking surface 13 at one end of the respective embossment to limit rotation of the stud unit. Supporting elements 16 are provided near the longitudinal ends 17 of the shim plate and act to support the spring member 10 in final assembly of the parts. The elements 16 are raised from the normal plane of the plate in the installation shown in the drawings to space the spring member 10 a predetermined distance from the surfaces 13 of the embossments 14 for a purpose to be described.

The spring member 10 is preferably bowed longitudinally and provides an aperture 18 adapted to align with the aperture 11 of the shim plate when the parts of the socket unit are in final assembly. A pair of slots 19—19 extends from opposite sides of the aperture 18, as most clearly shown in Fig. 1, a predetermined distance toward the longitudinal ends of the member 10. The plate member 10 provides embossments on opposite sides of the aperture 18 and these embossments are preferably of arc-shape. Each embossment has a gradually rising cam surface 20 extending from a low point adjacent one of the slots 19 and continuing to a high point 21 adjacent the other slot. An indentation is provided intermediate the ends of each embossed portion providing locking recesses 22 adapted to receive lateral projections carried by the rotary stud unit 2, as will be more fully described in connection with the operation of the fastener.

Figure 6:
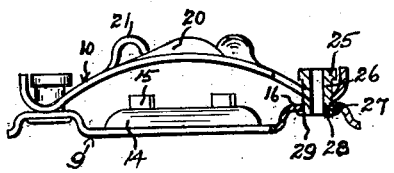
Fig. 6 is a side elevation of the stud engaging or socket unit forming a part of my fastener device.

In assembling the shim plate 9 and the spring member 10 as a unit, the parts are first disposed in superposed position with the slots 19 of the spring member 10 in alignment with openings 23 (Fig. 3) in the raised elements 16 of the shim member. The parts are secured together in my preferred form through means of a pair of hollow bushings (Fig. 6) each of which provides a head portion 25 overlying the spring member 10 and a shank 26 extending through the slot 19 and having a lower shoulder 27 resting on the raised portion 16 to maintain the head 25 in predetermined spaced position relative to the shim member. A reduced neck 28 extends from the shank 26 through the opening 23 of the shim plate and the neck is headed over as at 29 on an opposite side of the plate from the shoulder 27 to secure the parts in initial assembly as a unit as shown in Fig. 6.

The socket unit is secured to the inner side 3 of the plate 4 through means of a solid pin (Fig. 3) which has a head 30 of greater diameter than the bore of the bushing disposed adjacent the head 25 of the bushing and a shank 31 which extends through the bore of the bushing and an opening 32 of the plate 4. The shank 31 has a head 33 received within a countersunk hole of the plate 4.

The rotating unit 2 comprises a head portion 34 which is larger in diameter than the opening 7 of the plate 5 so as to cooperate with the plate 5 in bearing engagement therewith. A shank 35, which is smaller in diameter than the opening 7, extends through the opening 7 and carries a pair of crosspins 36—37. The crosspins are spaced a predetermined distance one from another axially of the shank and the crosspin 37 intermediate the pin 36 and stud head 34 is spaced a predetermined distance from the stud head 34 for a purpose to be described. A strengthening grommet 38 (Fig. 10) overlapping opposite sides of the embossment 8 of the plate 5 adjacent the opening 7 operates to strengthen the installation and prevent the head 34 from pulling through the opening 7 of the lower plate during operation of the fastener.

To assemble the plates 4 and 5 by means of my improved fastener it is only necessary to bring the plates into superposed position with the aperture 7 of the plate 5 in substantial alignment with the opening 11 of the shim plate. During this operation the shank 35 of the stud unit will pass through the opening 11 of the shim plate and also through the opening 18 of the spring member. The free ends 39 of the pin 36 are now in registration with the slots 19—19 of the spring member and the free ends 40 of the pin 37 are in registration with the slots 12 of the shim plate. Rotation of the stud unit in a clockwise direction viewing Fig. 2 by a suitable rotating tool inserted in the slot 41 (Fig. 2) causes the ends 39 of the pin 36 to engage the cam portions 20 of the spring member 10 and the spring will thus be compressed until the pin ends reach the locking recesses 22 adjacent the stops 21 where the fastener is in locked position and is held against accidental unlocking by the tension of the spring against the crosspin 36. While the pin 36 is being rotated into locking engagement with the plate member 10 the pin 37 has also been rotated into a position substantially as shown in Figs. 3 and 4 with its ends 40 bearing against locking surfaces 13 of the embossments 14 of the shim plate. Thus, the plate members 4 and 5 are held between the head 34 of the stud unit and the crosspin 37 against any substantial movement away from each other. As a result any pressure tending to force the plates 4 and 5 away from each other flatwise are resisted by the clamping action between the stud head and the pin 37.

Figure 7:
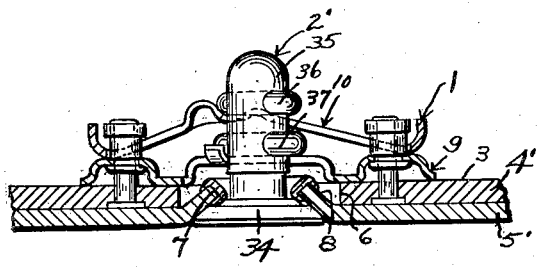
Fig. 7 is a view similar to Fig. 3 and showing a second form of my invention.
Figure 8:
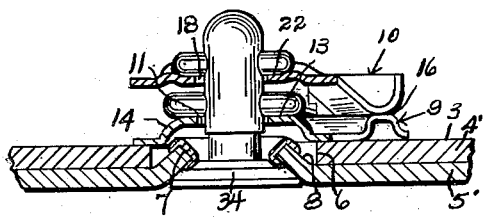
Fig. 8 is a section similar to Fig. 4 showing the second form of my invention.
Figure 9:
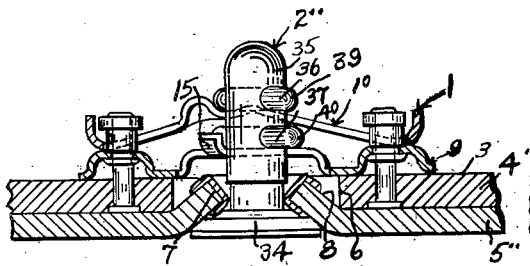
Fig. 9 is a section similar to Fig. 3 showing a third form of my invention.
Figure 10:
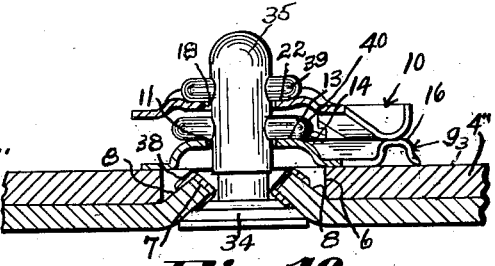
Fig. 10 is a figure similar to Fig. 4 showing my third form of invention.

A different stud member is shown in each of the three installations set out in the drawings. The stud members are identical except that the length of the shank and the distance between the pin 37 and the stud head 34 varies in each of the three forms. The same shim plate, however, is used in all the installations having embossments 14 of a height which, for purposes of illustration, may be considered the maximum. The purpose of varying the dimensions of the stud member is to enable the fastener device to be used to secure plates having varying combined thicknesses. Thus, in the installation shown in Figs. 1–4 the distance between the pin 37 and the stud head is relatively short with the result that the stud unit is operable to secure together plates which are relatively thin. In the installation of Figs. 7 and 8 the shank is longer and the pin 37 is spaced a greater distance from the stud head 34. Thus, the fastener is operable to secure plates which have a greater combined thickness than that of the plates illustrated in Figs. 1–4. In the installation shown in Figs. 9 and 10 the shaft is the longest and pin 37 is spaced an even greater distance from the head 34. Consequently, the last-mentioned device is capable of securing an installation of greater thickness than that illustrated in either of the other installations. Thus, by using the same socket unit with the three forms of stud units illustrated it is possible to secure together installations of three thicknesses which vary substantially one from the other.

Figure 11:
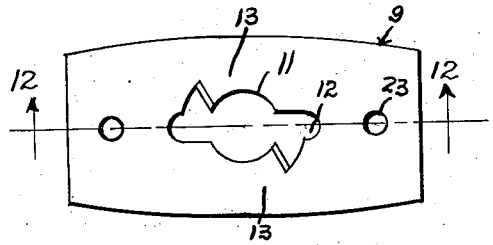
Fig. 11 is a top plan view of a modified form of shim plate.
Figure 12:
Fig. 12 is a section taken on the line 12—12 of Fig. 11.
Figure 13:
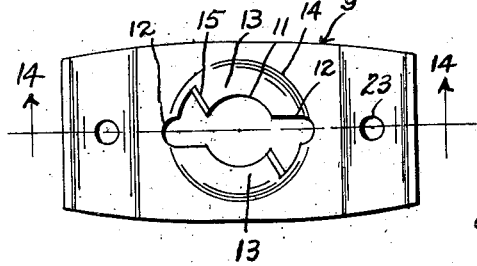
Fig. 13 is a plan view of another form of shim plate.
Figure 14:
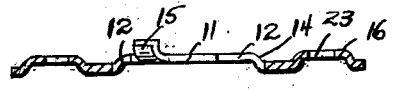
Fig. 14 is a section taken along the line 14—14 of Fig. 13.

In commercial practice, to illustrate the utility of the fastener, the combined thickness of the plates in the installation shown in Figs. 1–4, would be about .075 of an inch. The thickness of the plates shown in Figs. 7 and 8 would be about .175 of an inch and the thickness of the plates shown in Figs. 9 and 10 would be about .275 of an inch. An installation thickness intermediate those mentioned above can be taken care of by substituting for the shim plate illustrated in the installations of the drawings, shim plates ranging from those having no embossments, such as that shown in Figs. 11 and 12 to shims such as shown in Figs. 13 and 14, in which the embossments project a distance intermediate zero and the maximum. Thus, if any one of the three installation thicknesses mentioned above is increased an amount no greater than .099 of an inch the same stud is used, but a shim plate is substituted in which the height of the embossments is decreased an amount equivalent to the increase of the installation thickness. As an example, using the same figure .275 of an inch as the thickness of the installation shown in Figs. 9 and 10 and taking .090 of an inch for the height of the embossments if it is desired to increase the thickness of the installation to .355 of an inch a shim plate would be substituted, having embossments of a height of about .010 of an inch.

While I have illustrated and described preferred embodiments of my invention I do not wish to be limited thereby, because the scope of my invention is best defined by the following claims.

I claim:

1. In a fastener device of the rotary operative type, a completely rigid plate-like element adapted to be secured to one of the parts to be fastened, said plate-like element having an aperture and embossments adjacent said aperture on opposed sides thereof, a rotary member carried by another of the parts to be fastened having a shank adapted to pass through the aperture in said plate-like element, a crosspin assembled with said shank having its free ends projecting laterally on opposed sides of said shank, said free ends being adapted to engage said embossments upon relative rotation of the parts, a stud-holding spring member preassembled with said plate-like element, said shank having means in cooperative fastener engagement with said spring member to maintain said free ends in fastener engagement with said embossments.

2. In a fastener device of the rotary operative type, a completely rigid plate-like element adapted to be secured to one of the parts to be fastened, said plate-like element having an aperture and embossments adjacent said aperture on opposed sides thereof, a rotary member carried by another of the parts to be fastened having a shank adapted to pass through the aperture in said plate-like element, a crosspin assembled with said shank having its free ends projecting laterally on opposed sides of said shank, said free ends being adapted to engage said embossments upon relative rotation of the parts, a stud-holding spring member carried by said first part to be fastened, said shank having means in cooperative fastener engagement with said spring member to maintain said free ends in fastener engagement with said embossments and each of said embossments having a stop portion limiting rotary movement of said pin ends.

3. In a fastener device of the rotary operative type, a shim plate adapted to be secured to one of the parts to be fastened, said shim plate having an aperture, a raised locking surface adjacent said aperture and raised portions near opposed ends of said shim plate, a rotary member carried by another of the parts to be fastened having a shank adapted to pass through the aperture in said shim plate and having spaced pin-like lateral projections, one of said projections adapted to engage said locking surface on relative rotation of the parts, and a bowed spring member in assembly with said shim plate and disposed in superposed relation thereto, said spring member having its ends supported by said raised portions for the purpose described and said spring member having a cam cooperating with the other of said projections to hold the parts in fastened relation.

4. In a fastener device of the rotary operative type, a stud-engaging unit adapted to be secured to one of the parts to be fastened, said unit comprising a completely rigid plate-like element and a spring member in preassembled relation prior to attachment of said unit to said part to be fastened, said plate-like element having an aperture and a locking surface adjacent said aperture, a rotary member carried by another of the parts to be fastened having a shank adapted to project through the aperture in said plate element and having a lateral projection adapted to engage said locking surface upon relative rotation of the parts and said shank having means in cooperative fastener engagement with said spring member to maintain said projection in fastener engagement with said plate element.

5. In a fastener device of the rotary operative type, a stud-engaging unit adapted to be secured to one of the parts to be fastened, said unit comprising a shim plate and a bowed spring member in superposed relation, attaching means extending through said spring member and shim plate to hold said parts in loose assembly prior to attachment of said unit to one of said parts to be fastened, said shim plate having an aperture and a locking surface adjacent said aperture, a rotary member carried by another of the parts to be fastened having a shank adapted to project through the aperture in said plate element and having a pin-like lateral projection adapted to engage said locking surface upon relative rotation of the parts and said shank having means in cooperative fastener engagement with said spring member to maintain said projection in fastener engagement with said plate element.

6. In a fastener device of rotary operative type, a stud-engaging unit adapted to be secured to one of the parts to be fastened, said unit comprising a rigid shim plate and a bowed spring plate in superposed relation, hollow bushings extending through said shim plate and spring plate and having shoulders on opposed sides of said parts to hold the same in assembly prior to attaching said unit to one of said parts to be fastened, said shim plate having an aperture and locking surfaces on opposed sides of said aperture, said spring plate having an aperture in registration with said aperture of said shim plate and cam surfaces adjacent said aperture of said spring plate, a rotary member having a shank adapted to project through the apertures in said spring plate and shim plate, spaced crosspins assembled with said shank, one of said pins having its ends engaging said locking surfaces of said shim plate on relative rotation of said parts, and the other of said pins cooperating with said cams of said spring plate to hold the parts in fastened relation.

ALBERT C. MAYNARD.